INVENTORS
GERALD A. EISERT
LESTER W. HAAKER

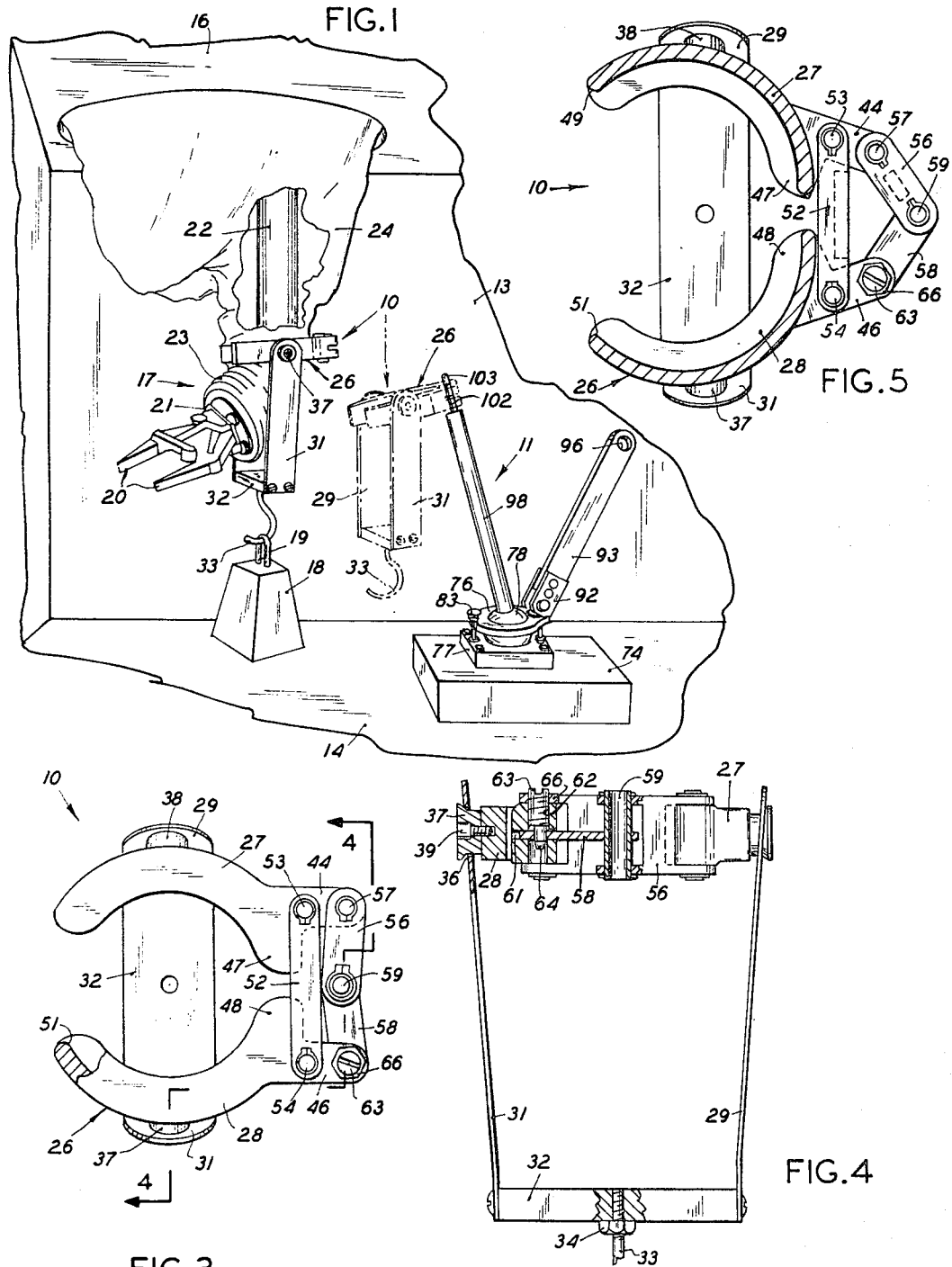

Braddock+Burd
ATTORNEYS 3,433,370
CLAMP-ON LOAD HOOK
Gerald A. Eisert, Hastings, and Lester W. Haaker, Red Wing, Minn., assignors to Central Research Laboratories, Inc., Red Wing, Minn., a corporation of Minnesota
Filed Feb. 21, 1966, Ser. No. 528,849
U.S. Cl. 214—1     11 Claims
Int. Cl. B25j 3/00; B66f 9/06

ABSTRACT OF THE DISCLOSURE

The hook assembly releasably attached to the slave arm of a master-slave manipulator with a pair of pivoted arcuate arms releasably locked on a ring assembly carried on the lower end of the slave arm. An overcenter toggle linkage holds the arms in locked positions on the ring assembly. A U-shaped frame pivotally mounted on the arms carries an upwardly open hook. The hook assembly is placed on a parking fixture used to store and hold the hook assembly in a selected park position. The parking fixture has a spherical lower end which cooperates with a clamp to hold the upright member of the parking fixture in a selected position.

---

This invention relates to accessory equipment for remote control manipulator machines and more particularly to a hook assembly attachable to a slave arm of a master-slave manipulator and a parking fixture for holding the hook assembly in a position convenient for attachment to the slave arm.

The object of the invention is to provide an improved hook assembly which is attachable to and detachable from a slave arm enclosed in a continuous flexible wall protective boot without the use of fastening members which penetrate through the protective boot to provide maximum security from contaminating materials.

Another object of the invention is to provide a hook assembly including a clamp mechanism operable to embrace opposite sections of a slave arm in response to movement of the slave arm into the clamp mechanism and to disengage the slave arm in response to movement of the slave arm out of the clamp mechanism.

A further object of the invention is to provide a remote control manipulator slave arm with support structure for a hook assembly and a protective boot enclosing the support structure and a substantial portion of the slave arm.

Still another object of the invention is to provide a portable parking fixture for supporting a hook assembly in selected positions so that the hook assembly may be readily aligned with and attached to a slave arm of a remote control manipulator.

An additional object of the invention is to provide a versatile combination hook assembly and parking fixture which is sturdy in construction, reliable in use, and efficient in operation.

The exact nature of the invention as well as other objects and advantages thereof will readily be apparent from the consideration of the following description and accompanying drawing, wherein:

FIGURE 1 is a perspective view of the hook assembly and parking fixture combination of the invention showing the hook assembly locked onto a slave arm of a remote control manipulator and the park position of the hook assembly on the parking fixture;

FIGURE 3 is a plan view of the hook assembly of FIGURE 1 showing the clamp mechanism in the closed position;

FIGURE 4 is a sectional view taken along the line 4—4 of FIGURE 3;

FIGURE 5 is a view similar to FIGURE 3, partly in section, showing the clamp mechanism in the open position;

Figure 8:
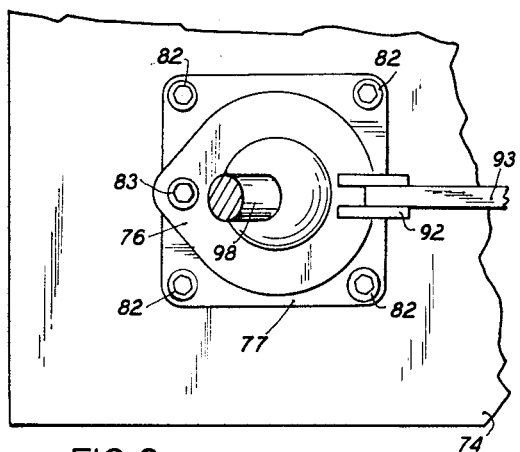
FIGURE 8 is a sectional view taken along the line 8—8 of FIGURE 7.

Referring to FIGURE 1, there is shown the hook assembly and parking fixture of this invention, indicated generally at 10 and 11 respectively, located in an enclosed area defined by barrier walls 13, floor 14 and ceiling 16. This area is remote from and not accessible to the operator of a remote control manipulator. The hook assembly 10 is mounted in assembled relation on a manipulator slave arm 17, such as the slave arm of a master-slave manipulator machine shown in the Patent No. 2,888,154 to Jelatis et al.

The particular slave arm configuration shown in FIGURE 1 is illustrative of only one type of remote control manipulator. The hook assembly of this invention has utility with slave arms of other types of remote control manipulators. For example, hook assembly 10 can be applied to manipulators having slave arms which extend through a horizontal tube into the slave end operating chamber. The hook assembly 10 is releasably attached to the slave arm 17 and in use moves with the slave arm to transport an object 18 which cannot readily be handled with the use of the slave arm fingers. The object 18 illustrated is a weight having an inverted U-shaped rod 19 forming an eye for accommodating the hook assembly 10.

The parking fixture 11 is used in the removal of the hook assembly 10 from the slave arm 17 and serves as a stand for holding the hook assembly 10 in a position convenient for attachment to the slave arm 17.

The manipulator slave arm 17 projects downwardly through a suitable hole in the ceiling 16 and terminates in a pair of movable finger members 20 projected from a wrist joint 21. An upright tubular member 22 attached at the lower end thereof to the wrist joint 21 projects upwardly through the hole in the ceiling 16. Control linkages (not shown) located within the wrist joint 21 and tubular member 22 function to control the movements of the finger members 20 and the wrist joint 21.

The wrist joint 21 is enclosed in a convoluted boot 23 formed of flexible plastic material shaped with a plurality of concentric folds and having the characteristics of being relatively impervious to contaminating materials, radioactive, bacteriological and the like. Joined to the upper end of the convoluted boot 23 is a flexible shroud 24 surrounding the upright tubular member 22 and secured in a sealed relation to the ceiling 16 to enclose the hole therein. The shroud 24 is of a size which permits both vertical extension of and lateral movement of the slave arm 17.

The hook assembly 10 comprises a clamp mechanism indicated generally at 26 having a pair of curved arms 27 and 28 positionable to embrace opposite sides of a suitable ring-shaped adapter or support ring 71 secured to the slave arm 17. As shown in broken lines in FIGURE 1, the clamp mechanism 26 may be removed from the slave arm 17 and supported on the parking fixture 11. A U-frame pivotally attached to opposite mid-portions of the arms 27 and 28 comprises a pair of upright flexible straps 29 and 31 secured at their lower ends to a horizontal base plate 32. A hook 33 having an upwardly open curved end and an upright shank is threaded into a bore located in the center of the plate 32. Nut 34 threaded on the shank of the hook 33 is used to lock the hook 33 in assembled relation with the plate 32. As shown in FIGURE 4, the upper sections of the straps 29 and 31 have holes 36 accommodating cylindrical bosses 37 and 38 formed outward radial flanges at the outer ends thereof. The diameters of the holes 36 are smaller than the diameters of the flanges on the bosses 37 and 38 whereby the straps 29 and 31 are maintained by the flanges in pivotal assembled relation on the bosses 37 and 38. Screws 39 positioned in axial stepped bores in the bosses 37 and 38 are threaded into the mid-portions of the arms 27 and 28 securing the bosses 37 and 38 to the arms 27 and 28 respectively.

Figure 2:
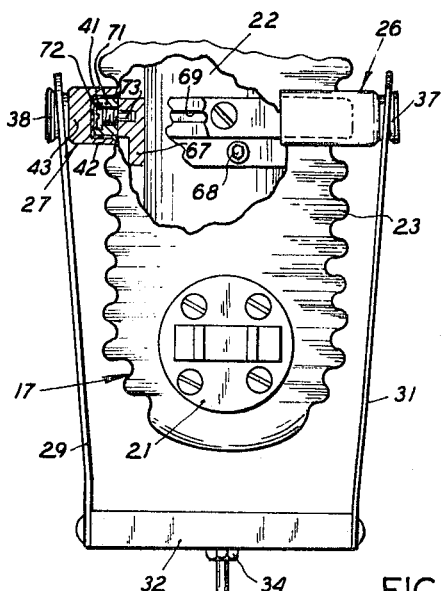
FIGURE 2 is an enlarged front elevational view of the hook assembly and slave arm of FIGURE 1 with parts shown in section.
Figure 6:
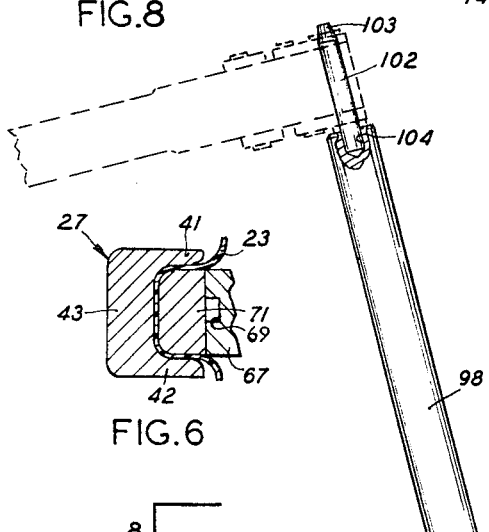
FIGURE 6 is an enlarged fragmentary sectional view of a clamp arm positioned on the support ring attached to the slave arm.

The arms 27 and 28 are substantially identical left and right hand members having a U-shape or channel-shaped in cross section. The channels of the arms 27 and 28 face each other and define opposite sectors of a circle. As shown in FIGURES 2 and 6, the arm 27 has spaced horizontal flanges 41 and 42 integral with an upright web 43. The inner arcuate edges of the flanges 41 and 42 are convexly curved or rounded to eliminate sharp cutting edges. Integral with the rear sections of the arms 27 and 28 are fingers 44 and 46 projected rearwardly in the planes of the arms. Arms 27 and 28 have projections 47 and 48 directed inwardly from the fingers 44 and 46. The opposite ends of the arms 27 and 28 are rounded and form lips 49 and 51 defining the mouth of the clamp mechanism 26.

The arms 27 and 28 are pivotally coupled together with an H-shaped link 52 having legs disposed on opposite sides of the fingers 44 and 46. Pins 53 and 54 project through these legs and fingers to pivotally connect the link 52 to the arms 27 and 28. C clips are used in conjunction with the pins 53 and 54 to maintain the pins in assembled relation with the link 52.

The arms 27 and 28 are moved from a closed locked position, shown in FIGURE 3, to an open position, shown in FIGURE 5, by a toggle linkage pivotally connected to the outer ends of the fingers 44 and 46. The toggle linkage includes an H-shaped link 56 pivotally connected by an upright pin 57 to the outer end of the finger 44. C clips clamped about opposite ends of the pin 57 maintain the link 56 in assembled relation with the finger 44. A flat link 58 is pivotally joined to the opposite end of the link 56 by an upright tubular pin 59 projected through the outer leg portions of the H-shaped link 56 and retained thereon by C clips disposed about opposite ends of the pin 59. The opposite end of the flat link 58 is positioned in a slot 61 in the end of the finger 46. An upright threaded bore 62 in the end of the finger 46 intersects the slot 61 and accommodates an eccentric screw 63 having an offset forward portion 64 projected through a hole in the end of the link 58 thereby pivotally connecting the link 58 to the finger 46. A nut 66 threaded onto the top portion of the eccentric screw 63 is used to lock the screw in an adjusted position. In use, the eccentric screw 63 can be rotated to change the effective pivot point of the flat link 58 within the finger 46 and thereby adjust the positions of the arms 27 and 28 relative to each other when the clamp mechanism 26 is in the lock position as shown in FIGURE 3. Thus, the gripping force of the arms 27 and 28 on ring 71 fastened to slave arm 17 may be altered. The arms 27 and 28 are maintained in the lock position by the toggle linkage which bears against the web portion of the H-shaped link 52. The tubular pin 59 is forward of an upright plane passing through the axes of the pin 57 and the pivot point 64 of the eccentric screw 63 thereby providing the toggle linkage with an over-center locking action which maintains the arms 27 and 28 in a closed or clamped position about the ring 71 fastened to slave arm tubular member 22.

As shown in FIGURE 5, the mouth opening of the clamp mechanism 26 defined by lips 49 and 51 is increased by movement of the toggle linkage away from the link 52. Upon movement from the closed position to the open position the arms 27 and 28 pivot on the pins 53 and 54 to move in opposite outward directions. The fingers 44 and 46 move toward each other. The straps 29 and 31 of the frame being flexible bend in opposite directions away from the convoluted boot 23.

As shown in FIGURE 2, an adapter ring 67 is concentrically positioned over the upright tubular member 22 above the wrist joint 21. The ring 67 is secured to the tubular member 22 by a plurality of circumferentially spaced bolts 68. The upper portion of the ring 67 is enlarged and has an annular peripheral groove 69. Concentrically positioned about the adapter ring 67 is a support ring 71 carrying a plurality of radially inwardly projecting screws 72. As shown in FIGURE 2, each screw 72 has a forward smooth end 73 projected into the annular peripheral groove 69 whereby the ring 71 may rotate relative to the ring 67 so as to minimize twisting of the convoluted boot 23 during rotational movement of the wrist joint 21 in relation to upright tubular member 22. In some types of manipulators the tube equivalent to tubular member 22 is fixed to the wrist joint so that support ring 71 can be fixed to the tube. As shown in FIGURE 6, the boot 23 extends over the support ring 71 thereby permitting the attachment of the hook assembly without the need for holes penetrating the boot which would increase the possibility of the transmission of foreign substances into and out of the enclosed volume or slave chamber.

Figure 7:
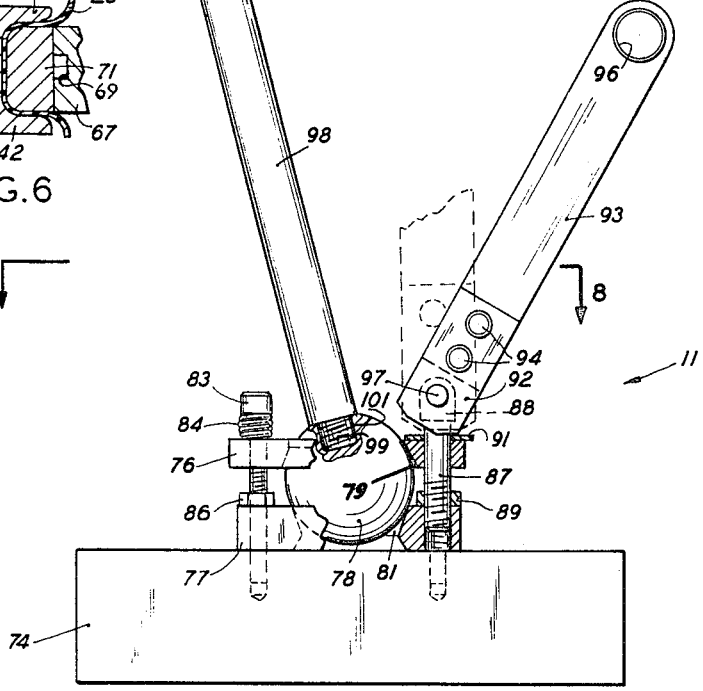
FIGURE 7 is an enlarged side view of the parking fixture of FIGURE 1.

The parking fixture for the hook assembly 10 shown in FIGURE 7 comprises a base 74 of heavy metal, such as lead or steel, supporting upper and lower plates 76 and 77 clamped about a ball 78. The plates 76 and 77 have opposite outwardly tapered openings 79 and 81 forming annular recesses receiving the ball 78. As shown in FIGURE 8, bolts 82 project through each corner of the lower plate 77 and are threaded into the base 74 to secure the lower plate 77 to the base.

A single bolt 83 projects through one side of the upper plate 76 and is threaded into the lower plate 77. A spring 84 positioned around the bolt 83 in engagement with the top surface of the upper plate 76 biases the plate 76 in a downward direction into engagement with the ball 78. A nut 86 threaded onto the lower end of the bolt 83 locks the bolt 83 in a fixed relationship with the lower plate 77. A second bolt 87 having a longitudinal flat end 88 projects through a hole in the opposite side of the upper plate 76 and is threaded into the lower plate 77. A nut 89 threaded on bolt 87 locks the bolt 87 with the lower plate 77. A washer 91 positioned on top of the upper plate 76 surrounds the bolt 87 and is engaged by a bifurcated cam member 92 having cam surfaces engageable with the washer 91. An elongated handle 93 is secured by rivets 94 to the upper portion of the cam member 92. The outer end of the handle 93 is provided with a transverse hole 96 used to receive the hook 33. A transverse pin 97 projected through the bifurcated cam member 92 and the flat head 88 of the bolt 87 pivotally mounts the cam member 92 and handle 93 on the bolt 87.

Projected upwardly from the ball 78 is a rod 98 having an axial threaded projection 99 at the lower end thereof turned into a threaded bore 101 in the ball 78. The opposite end of the rod 98 has an outwardly projected pin 102 having a concial-shaped upper end 103. Pin 102 is press fitted into an axial bore 104 in the end of the rod 98. The diameter of the pin 102 is slightly less than the internal diameter of the tubular pin 59 of the toggle linkage enabling the hook assembly 10 to be supported on the parking fixture 11 by placing the tubular member 59 over the upright pin 102 as shown in broken lines in FIGURES 1 and 7. The angular position of the rod 98 may be changed by moving the handle 93 to the broken line position as shown in FIGURE 7 thereby releasing the positive clamping action of the upper plate 76 on the ball 78 while continuing the braking action provided by spring 84 on the opposite end of upper plate 76. In this manner the rod 98 may be angularly moved to change the park position of the hook assembly 10. This position may be retained by moving the handle 93 in a downward direction forcing the upper plate 76 into positive gripping engagement with the ball 78.

In use, with the hook assembly 10 mounted on the slave arm 17 as shown in FIGURE 1 the clamp mechanism 26 is in the lock position as shown in FIGURE 3. In the lock position the arms 27 and 28 embrace opposite portions of the support ring 71. As shown in FIGURES 2 and 6 the convoluted plastic boot 23 is positioned around the outer or support ring 71 between the U-shape surfaces of the arms 27 and 28. The object 18 may be moved with the use of a hook 33 by moving the slave arm 17 to insert the hook into the eye of the U-shaped rod 19 to connect the hook assembly 10 to the object 18. Movement of the slave arm in the downward and rearward direction releases the hook 33 from the object 18.

In the removal of the hook assembly 10 from the slave arm 17 the slave arm is moved in a direction until the tubular pin 59 is in alignment with the upright pin 102 carried by the rod 98 of the parking fixture 11. Downward movement of the slave arm 17 positions the tubular pin 59 about the pin 102 to mount the hook assembly 10 on the parking fixture 11. To release the clamping action of the arms 27 and 28 on the support ring 71 the slave arm 17 is moved in a forward direction away from the parking fixture 11. This movement causes the toggle linkage to move over center to the open position as shown in FIGURE 5. With the tubular pin 59 fixed the arms 27 and 28 in response to forward movement pivot outwardly in opposite directions about the pins 53 and 54 respectively releasing the grabbing action of the arms on the support ring 71. In the open position the lips 49 and 51 of the arms 27 and 28 define a mouth separated a distance which is slightly greater than the diameter of the support ring 71 whereby the slave arm 17 is free to move from the clamp mechanism 26.

To assemble the hook assembly 10 onto the slave arm 17 the slave arm is lowered to a position where the support ring 71 is in alignment with the arms 27 and 28. The slave arm 17 is then moved in a rearward direction wherein the support ring 71 is moved between the flanges 41 and 42 of each arm. When the ring 71 engages the upright web portions of the projections 47 and 48 of the arms 27 and 28, the arms pivot about pins 53 and 54 to a closed position about the support ring 71. The toggle links 56 and 58 pivot into substantial alignment. When the tubular pin 59 moves to the over-centered position as shown in FIGURE 3 the arms 27 and 28 are locked about the support ring 71.

For any arbitrary placement of base 74 of the parking fixture there exists only one angular position of rod 98 and pin 102 that will allow ready mounting and removal of the hook assembly 10 on and from the parking fixture 11. Most manipulators are pivoted at some fixed point above the work area. The slave arm can only pivot about the point and telescope longitudinally, while the wrist joint can rotate about the arm axis in azimuth rotation. For proper operation the axis of rod 98 must be adjusted parallel to the axis of member 22 of the slave arm and spaced from member 22 a distance substantially equal to the distance between the axis of pin 59 and the center of the curved clamp arms 27 and 28 in the closed position shown in FIGURE 3.

This alignment can be accomplished by a single manipulator by placing base 74 in a convenient location with the handle 93 aligned so it includes the upper pivot axis of the manipulator. With the hook assembly 10 parked on pin 102 in the open position, handle 93 is moved to the release position unlocking plate 76 enabling rod 98 to be adjusted. Rod 98 is retained in position by the resilient clamping force of spring 84. The slave arm is used to position rod 98 to an orientation approximating parallel alignment with tubular member 22. A tentative alignment of support ring 71 with arms 27 and 28 can be made to determine if further refinements are necessary to change the angular position of clamp arms 27 and 28.

The slave arm 17 is next used to move handle 93 to the lock position to positively hold rod 98. The parking fixture is now adjusted for ready mounting of the hook assembly on the support ring 71. This is accomplished by moving the slave arm longitudinally toward the rod 98 locating the support ring 71 between arms 27 and 28. Continued movement of the slave arm in this direction causes arms 27 and 28 to pivot in a closed clamped position about the support ring 71. Upward movement of the slave arm carries hook assembly from pin 102.

To park hook assembly 10 on fixture 11 slave arm is moved to a position to align pin 59 with pin 102 on the rod 98. After slave arm is lowered it is moved longitudinally away from rod 98 forcing arms 27 and 28 in opposite directions thereby releasing the clamp action of the arms on support ring 71.

When satisfactory removal and parking of hook assembly 10 on fixture 11 is achieved the position of base 74 on floor 14 can be marked so that the fixture can be relocated.

While there have been shown, described and pointed out the fundamental novel features of the invention, it will be understood that various omissions, substitutions, changes in form, and detail of the hook assembly and parking fixture illustrated may be made by those skilled in the art without departing from the spirit of the invention. The specific embodiments described and shown are given by way of example only and the invention is limited only by the terms of the appended claims.

What is claimed is:

1. In combination, a slave arm of a remote control manipulator, said slave arm including a wrist joint connected to a movable elongated member, a ring support means secured to said elongated member adjacent said wrist joint, and a hook assembly including a clamp mechanism releasably attachable to said support means, said clamp mechanism having a pair of curved arms and means to releasably lock the arms on the ring support means, a frame mounted on said clamp mechanism, and a hook secured to said frame.

2. The combination of structure defined in claim 1 further characterized by said support means including a first ring secured to said elongated member and a second ring rotatably mounted on said first ring.

3. The combination of structure defined in claim 1 further characterized by flexible wall cover means positioned about said wrist joint, elongated member, and support means for enclosing the same.

4. In combination, a slave arm of a remote control manipulator, said slave arm including a wrist joint connected to a movable elongated member, support means secured to said elongated member adjacent said wrist joint, and a hook assembly including a clamp mechanism releasably attachable to said support means, a frame mounted on said clamp mechanism, and a hook secured to said frame, said clamp mechanism having a pair of curved arms pivotally connected to a link, said arms movable to a locked position embracing said support means, and toggle linkage pivotally connected to said arms operable on movement thereof away from said link to move said arms to an open position and operable on movement toward said link to move said arms toward each other to the closed locked position.

5. The combination of structure defined in claim 4 further characterized by said toggle linkage having a tubular connecting pin, parking fixture means for holding said hook assembly when disconnected from said slave arm, said fixture means including a member and an upright pin projected therefrom, said pin having a size and shape to fit into the tubular connecting pin of the toggle linkage, and means for adjustably mounting said member whereby the park position of the clamp mechanism may be changed.

6. The combination of structure defined in claim 4 further characterized by parking means for holding the hook assembly when disconnected from said slave arm, said parking means including a member engageable with said clamp mechanism so that movement of the clamp mechanism relative to said member selectively moves the clamp mechanism to lock and unlocked positions.

7. The combination of structure defined in claim 4 wherein said frame is a U-shaped member pivotally connected to said arms and said hook is upwardly open and secured to the base portion of the U-shaped frame.

8. The combination of structure defined in claim 6 including: a spherical-shaped member secured to the lower end of the member, and clamp means positioned about the spherical member and secured to the base, said clamp means including an actuator movable to a first position to lock the spherical member with the clamp means and to a second position to release the holding action of the clamp means on the spherical-shaped member whereby the angular position of the elongated member may be adjusted.

9. A hook assembly attachable to a slave arm of a remote control manipulator and usable for moving objects comprising a clamp mechanism releasably attachable to said slave arm whereby movement of the slave arm dictates the position of the hook assembly, said clamp mechanism including a pair of curved arms having channel-shaped transverse cross sections, said arms positioned with the open concave sides thereof facing each other, each arm having outwardly projected fingers secured to one end thereof, a first link pivotally connected on opposite ends thereof to the end portions of each finger secured to the respective arm, second link pivotally connected to the outer end of one finger, a third link pivotally connected to the outer end of the other finger, pin means pivotally connecting the adjacent ends of the second and third links whereby the second link and third link form a toggle linkage operable to pivotally move the arms toward each other to a clamp position about the slave arm to pivotally move the arms away from each other to a release position relative to the slave arm, frame means connected to the clamp mechanism, and hook means secured to the frame means, said hook means on movement of the slave arm usable to hold an object.

10. The hook assembly defined in claim 9 wherein the structure for pivotally connecting the third link to the other finger includes adjustable means for changing the effective pivot point of the third link.

11. The combination of structure defined in claim 4 further characterized by said support means including a first ring secured to said elongated member and a second ring rotatably mounted on said first ring.

References Cited
UNITED STATES PATENTS

| | | |
|---|---|---|
| 2,861,701 | 11/1958 | Bergsland et al. |
| 2,888,154 | 5/1959 | Jelatis et al. |
| 3,019,929 | 2/1962 | Gardner et al. _____ 214—620 |

ROBERT G. SHERIDAN, *Primary Examiner.*

U.S. Cl. X.R.

214—620